April 15, 1924.
C. J. WILSON
1,490,302
MOTION PICTURE PHOTOGRAPHY
Filed Jan. 10, 1921    2 Sheets-Sheet 1
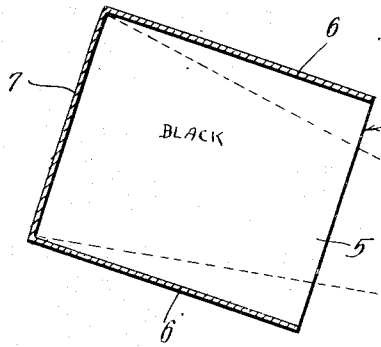
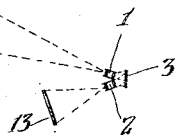
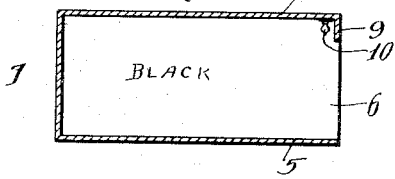
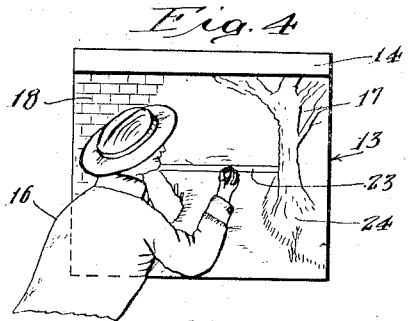
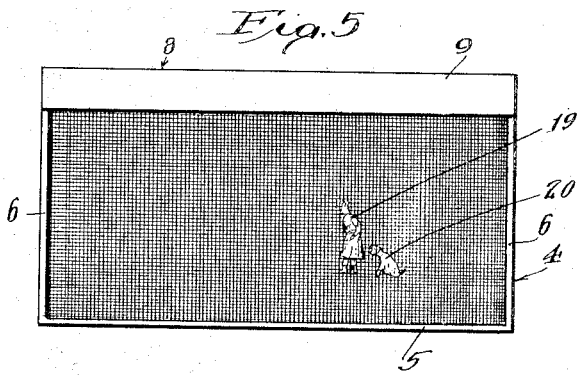
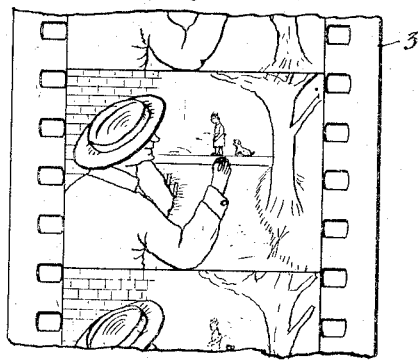
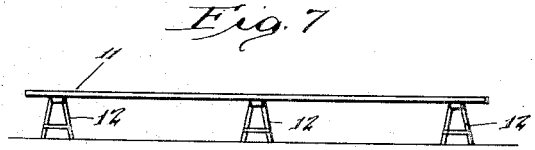
INVENTOR.
Charles J. Wilson
BY Frederick Whyor
ATTORNEY

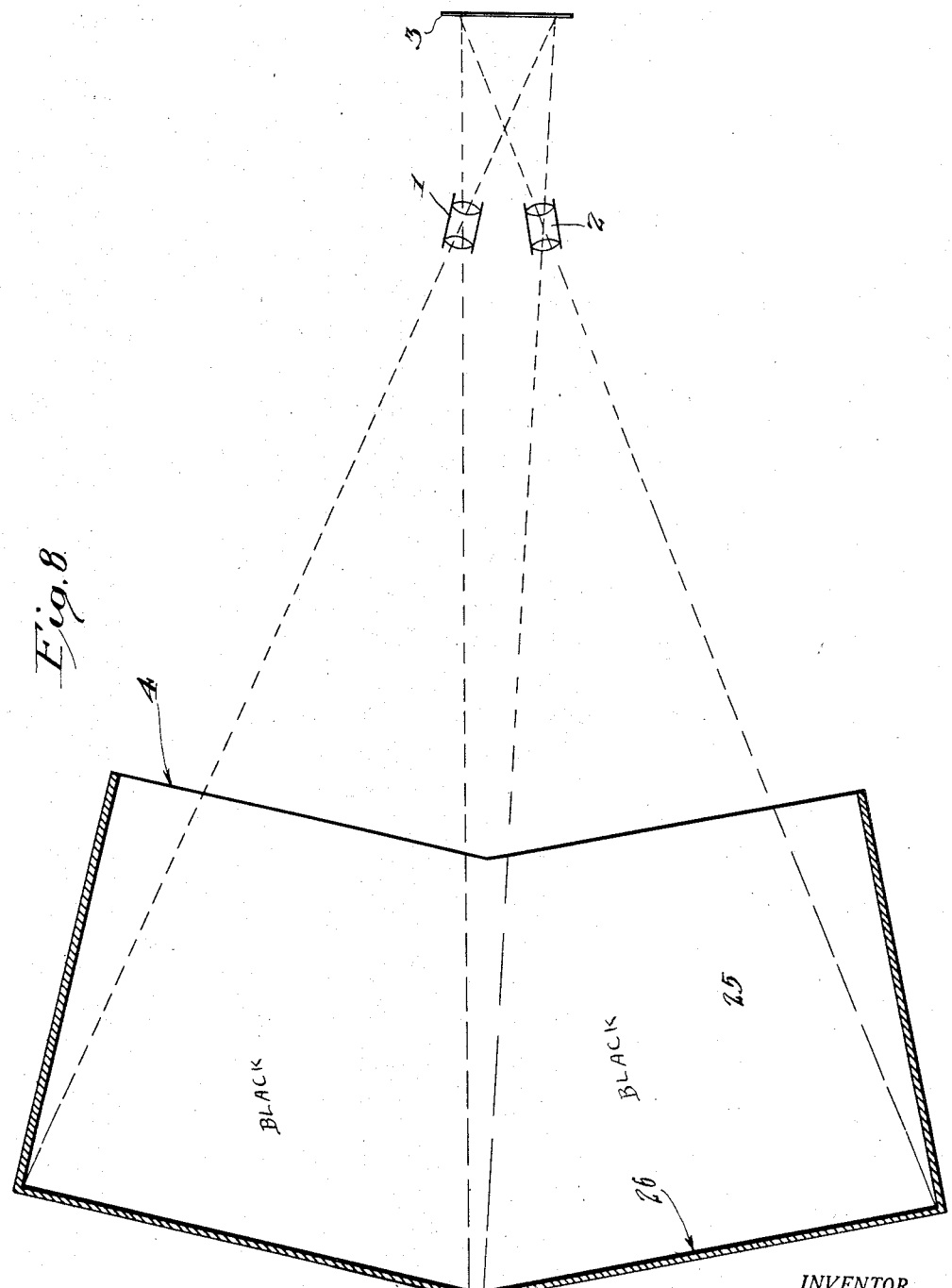

Patented Apr. 15, 1924.

1,490,302

UNITED STATES PATENT OFFICE.

CHARLES J. WILSON, OF PASADENA, CALIFORNIA, ASSIGNOR TO WONDERGRAF PRODUCTION CORPORATION, OF LOS ANGELES, CALIFORNIA, A CORPORATION OF CALIFORNIA.

MOTION-PICTURE PHOTOGRAPHY.

Application filed January 10, 1921. Serial No. 436,090.

*To all whom it may concern:*

Be it known that I, CHARLES J. WILSON, a citizen of the United States, and a resident of Pasadena, in the county of Los Angeles and State of California, have invented certain new and useful Improvements in Motion-Picture Photography, of which the following is a specification.

An object of the invention, in general, is to produce weird effects in a realistic manner.

More specifically, an object is to combine upon a single film the image of an actor in one environment with images of objects in a different environment as represented by cartoons, photographs, paintings or other artificial productions or as represented by natural scenes.

Another object is to produce motion pictures having certain characteristics which could not be produced by any other method.

Another object is to provide a method whereby a drawing, the artist making the drawing and an actor or actors may be combined upon a photographic film, so as to give the effect of an actor appearing in a scene as said scene is being drawn by another actor, the artist.

Other objects and advantages will appear hereinafter.

The accompanying drawings illustrate the invention:

Figure 1 is a plan view of an apparatus with which the new method can be effected, the view being diagrammatic and the black stage and picture support being shown in section.

Figure 2 is an enlarged sectional elevation of the black stage;

Figure 3 is an enlarged sectional elevation of the black board.

Figure 4 is a front elevation of the picture support showing thereon a drawing being delineated by the artist, who is also depicted.

Figure 5 is a front elevation of the black stage showing actors in position in the stage carrying out their act.

Figure 6 is an enlarged view of a fragment of the photographic film bearing the images of the actors in the stage, of the drawing on the black board and of the artist as they are registered on the film.

Figure 7 is an elevation of properties employed in the black stage.

Figure 8 is a diagrammatic plan view of a different form of apparatus than that shown in Figure 1.

It is to be understood that the apparatus disclosed in Figure 1 of the drawings is merely suggestive of a type of apparatus that may be employed for carrying out this new method, it being understood that any other suitable apparatus of different construction and arrangement of the different elements may be employed within the spirit and scope of the invention. In Figure 1 of the drawings, there are shown a plurality of lenses 1, 2 arranged at an angle with respect to one another so that light rays projected through them, respectively, impinge simultaneously upon a film strip 3 which may be moved in the usual or any preferred manner for producing motion pictures. It is not necessary to illustrate and describe the film operating mechanism, since such mechanism is well known in this art. In alinement with the lens 1 is a black stage 4, which is substantially non-actinic so that no portion of it will make a photographic impression upon the film 3 when the film is exposed to light rays passing through the lenses 1, 2. The black stage is open in front and is provided with a floor 5, side walls 6, a rear wall 7, a ceiling 8 and a front wall 9 closing the front of the upper portion of the stage. Within the upper portion of the stage hidden from view from the front thereof by the wall 9 are suitable lamps 10 for illuminating the actor or actors who are to appear in the stage.

The stage may be provided with any suitable stage properties and such properties will preferably be non-actinic and, therefore, black. As illustrative of properties that may be employed in producing a picture by this method, I have shown in Figure 7 a platform 11 mounted on suitable supports 12 so as to raise the platform above the stage floor.

In alinement with the lens 2 in Figure 1 there is provided a support 13 on which a drawing, cartoon, painting, photograph or other miniature may be placed for photographing or, if desired, a suitable black ground may be provided on the support 13 to enable the drawing to be made thereon with chalk or crayon. The surface of the support 13 is thus susceptible of receiving a drawn or painted sketch and said surface and the background 7 for the actor correspond in actinic value. The support 13 is preferably provided with a hood 14 at its upper edge projecting in front of the support, and beneath or within said hood there are provided suitable lamps 15 for illuminating the drawing, picture or photograph on the support so that it may be photographed. It is to be understood that the lighting of the actors in the stage and the lighting of the drawing or other miniature on the support 13 may be achieved by other means than those disclosed. For example, the lighting may be effected by projecting light from a position outside of the stage into the stage and projecting light from a suitable source positioned in front of the support 13. Such light sources must, necessarily, be outside of the field of view of the lenses 1, 2.

With the apparatus above described, the new method of making motion pictures is as follows: Assume, for example, that one of the actors is the artist indicated at 16 in Figure 4, that the artist as represented in said figure is producing a drawing on the support 13, and that he has already drawn a tree 17 and a brick wall 18; and assume further that the story to be portrayed includes among other features the appearance of a girl and a dog in the picture that is being sketched by the artist. The girl indicated at 19 and dog indicated at 20 will be placed upon one end of the platform 11 previously placed within the stage upon the supports 12, so that the actors will be elevated above the stage floor 5. Having predetermined a plane on the drawing that will co-incide with the plane of the platform 11, when the stage and the drawing are viewed through the camera lenses 1, 2, the artist will sketch in a bridge 23 so as to make it appear in the picture taken by the camera as though the girl and dog are actually traversing the bridge. As soon as the artist has connected the bridge with the stream bank 24, the girl and dog proceed along the platform 11 within the stage 4. It is to be understood that the platform 11 and its supports 12 are made black so that they completely blend with the black interior of the stage. As the artist works on his sketch, draws in the bridge, and the girl and dog proceed across the platform, the photographer operates the film 3 in a manner well understood in the motion picture art, thus obtaining on the film a series of exposures showing the image of the artist making the sketch, and the images of the girl and dog walking upon the bridge that the artist has drawn. The "frame" showing the exposure taken with the girl and dog in the positions shown in Figure 5 is represented in Figure 6. The picture just described is quite simple, but it serves to illustrate the principle upon which the invention operates.

In place of a sketch being produced on the support 13 by an artist, a finished drawing, painting, photograph or other miniature may be placed on the support 13 and the actors in the stage photographed into the scene thus represented.

It is understood that the method may also be employed by substituting a real scene for the sketch, photograph or other miniature mounted on the support 13. To make this clear, the apparatus may be constructed as shown in Figure 8 of the drawings where the same lenses 1, 2, film 3 and black stage 4 are provided as described hereinbefore. Alongside of the black stage 4 there is provided a second stage 25 and any desired stage properties may be utilized in this stage so that the images of said properties will appear on the film in combination with the images of the actors occupying the black stage. The set-up of the scene on the stage 25 may represent an interior or an exterior. If it is to be an interior scene, chairs and a suitable table or other real furniture may be arranged and a scenic background 26 prepared to represent the wall or walls of the apartment. One of the advantages, in separating the actors from the scene in which they are to appear in the completed picture, will be clear when it is considered that certain effects can be produced in this manner that could not otherwise be produced, or at least would be very difficult of production. An example, for instance, would be the appearance of a dancer within a bonfire. The dancer would occupy the black stage and the bonfire would occupy the scenic stage. Many other extraordinary and weird effects can be produced in like manner, the pictures as subsequently projected upon the exhibiting screen being realistic in the highest degree, and it being impossible for the observer to distinguish anything in the projected picture that indicates in the least as to how the realistic results are secured with the camera.

It is to be understood that any stage properties employed within the stage 4 as well as said stage will be black so that such properties cannot be distinguished from the background of the stage. Thus neither the stage nor the properties can have any actinic value, in consequence of which they will not register on the film when it is exposed for securing the images of the actors within the stage. The actors within the stage 4, or at least those portions of the actors which are to be photographically registered on the film, are made light in color tone, by light colored garments or otherwise, so that they contrast sharply with the black of the stage and its properties.

In making the sketch, the artist will preferably employ white or blue white chalk or crayon. It is understood that, owing to limitations set by pen drawings, the showing in Figures 4 and 6 of the drawings is the reverse of what it is in reality, since the lines represented as being black are in the practice of this method substantially white and the ground tone though represented by the natural white of the paper is black in practice.

I claim:

1. The method of making motion pictures, which consists in projecting upon a single strip of sensitized film through different lenses the image of an actor constructing a miniature against a black background and the image of a second actor positioned in a black stage, the image of the second actor appearing within the image of the miniature upon the film.

2. The method of making motion pictures, which consists in projecting upon a single strip of sensitized film through different lenses the image of a miniature against a black background and the image of an actor positioned in a black stage, the image of the actor appearing within the image of the miniature upon the film.

3. The method of making motion pictures, which consists in projecting through one lens upon a "frame" of sensitized film the image of a surface susceptible of receiving a drawn or painted sketch together with the image of an artist while sketching on said surface, and projecting through a second lens upon said "frame" the image of an actor, there being a background for the actor corresponding in actinic value with the surface upon which the sketch is being made, and the sketch contrasting in actinic value with said surface and background.

4. The method of making motion pictures, which consists in projecting through one lens upon a "frame" of sensitized film the image of a surface having a sketch thereon, and projecting through a second lens upon said "frame" the image of an actor, there being a background for the actor, the background and the surface upon which the sketch is made corresponding in actinic value, and the sketch contrasting in actinic value with said surface and background.

Signed at Los Angeles, California, this 28th day of December, 1920.

CHARLES J. WILSON.

Witnesses:
GEORGE H. HILES,
L. BELLE WEAVER.